(12) United States Patent
Lam et al.

(10) Patent No.: US 9,979,285 B1
(45) Date of Patent: May 22, 2018

(54) RADIATION TOLERANT, ANALOG LATCH PEAK CURRENT MODE CONTROL FOR POWER CONVERTERS

(71) Applicant: Crane Electronics, Inc., Redmond, WA (US)

(72) Inventors: Cuon Lam, Renton, WA (US); Hach Nguyen, Lynnwood, WA (US); Khoa Nguyen, Seattle, WA (US); Peter Odell, Seattle, WA (US); Sovann Song, Bothell, WA (US)

(73) Assignee: Crane Electronics, Inc., Redmond, WA (US)

( * ) Notice: Subject to any disclaimer, the term of this patent is extended or adjusted under 35 U.S.C. 154(b) by 0 days. days.

(21) Appl. No.: 15/786,368

(22) Filed: Oct. 17, 2017

(51) Int. Cl.
| | |
|---|---|
| *H02M 1/08* | (2006.01) |
| *H02M 3/156* | (2006.01) |
| *H02M 1/44* | (2007.01) |
| *H02M 3/07* | (2006.01) |
| *H02M 1/42* | (2007.01) |
| *H05B 33/08* | (2006.01) |
| *H02J 3/18* | (2006.01) |

(52) U.S. Cl.
CPC ............... *H02M 3/07* (2013.01); *H02J 3/18* (2013.01); *H02M 1/08* (2013.01); *H02M 1/4208* (2013.01); *H02M 3/156* (2013.01); *H05B 33/0815* (2013.01); *H05B 33/0845* (2013.01); *H02M 1/44* (2013.01)

(58) Field of Classification Search
CPC .......... H02M 3/07; H02M 3/156; H02M 1/08; H02M 1/4208; H02M 1/44; H02J 3/18; H05B 33/0815; H05B 33/0845

USPC ................................. 323/271, 282–285, 351
See application file for complete search history.

(56) References Cited

U.S. PATENT DOCUMENTS

| | | | |
|---|---|---|---|
| 3,144,627 | A | 8/1964 | Dunnabeck et al. |
| 3,201,728 | A | 8/1965 | McWhirter |
| 3,699,424 | A | 10/1972 | Hart et al. |
| 3,831,080 | A | 8/1974 | Zabert et al. |
| 3,886,433 | A | 5/1975 | Watanabe |

(Continued)

FOREIGN PATENT DOCUMENTS

| | | |
|---|---|---|
| CN | 2307390 Y | 2/1999 |
| CN | 101326705 A | 12/2008 |

(Continued)

OTHER PUBLICATIONS

"Application Guide: Theory of Operation," MicroPower Direct, retrieved from http://micropowerdirect.com/PDF%20Filed/Application%20Notes/Power%20Supply%20Theory%20of%20Operation.pdf on Apr. 18, 2012, 6 pages.

(Continued)

*Primary Examiner* — Timothy J Dole
*Assistant Examiner* — Ivan Laboy Andino
(74) *Attorney, Agent, or Firm* — Seed IP Law Group LLP

(57) ABSTRACT

Systems and methods for providing peak current mode control (PCMC) for power converters using discrete analog components. Peak current mode control functionality for latching, set, reset, clocking and slope compensation is provided via available analog components that provide improved performance, design flexibility, reliability, and radiation tolerance. Discrete analog components may include analog comparators, resistors, capacitors, diodes, etc.

20 Claims, 6 Drawing Sheets

(56) References Cited

U.S. PATENT DOCUMENTS

| | | | |
|---|---|---|---|
| 4,128,868 A | 12/1978 | Gamble | |
| 4,255,784 A | 3/1981 | Rosa | |
| 4,337,569 A | 7/1982 | Pierce | |
| 4,354,162 A | 10/1982 | Wright | |
| 4,482,945 A | 11/1984 | Wolf et al. | |
| 4,524,412 A * | 6/1985 | Eng | H02M 3/3387 323/285 |
| 4,533,986 A | 8/1985 | Jones | |
| 4,618,812 A | 10/1986 | Kawakami | |
| 4,635,002 A | 1/1987 | Riebeek | |
| 4,683,527 A | 7/1987 | Rosa | |
| 4,719,552 A | 1/1988 | Albach et al. | |
| 4,743,835 A | 5/1988 | Bossé et al. | |
| 4,813,126 A | 3/1989 | Williamson | |
| 4,814,735 A | 3/1989 | Williamson | |
| 4,833,437 A | 5/1989 | Williamson | |
| 4,837,535 A | 6/1989 | Konishi et al. | |
| 4,920,309 A | 4/1990 | Szepesi | |
| 4,956,626 A | 9/1990 | Hoppe et al. | |
| 4,992,919 A | 2/1991 | Lee et al. | |
| 5,031,066 A | 7/1991 | Wagner et al. | |
| 5,068,774 A | 11/1991 | Rosa | |
| 5,148,357 A | 9/1992 | Paice | |
| 5,329,695 A | 7/1994 | Traskos et al. | |
| 5,343,383 A | 8/1994 | Shinada et al. | |
| 5,396,165 A | 3/1995 | Hwang et al. | |
| 5,418,502 A | 5/1995 | Ma et al. | |
| 5,430,640 A | 7/1995 | Lee | |
| 5,436,550 A | 7/1995 | Arakawa | |
| 5,469,124 A | 11/1995 | O'Donnell et al. | |
| 5,481,225 A | 1/1996 | Lumsden et al. | |
| 5,521,807 A | 5/1996 | Chen et al. | |
| 5,631,822 A | 5/1997 | Silberkleit et al. | |
| 5,638,262 A | 6/1997 | Brown | |
| 5,691,629 A | 11/1997 | Belnap | |
| 5,694,303 A | 12/1997 | Silberkleit et al. | |
| 5,708,571 A | 1/1998 | Shinada | |
| 5,734,563 A | 3/1998 | Shinada | |
| 5,774,347 A | 6/1998 | Nakanishi | |
| 5,777,866 A | 7/1998 | Jacobs et al. | |
| 5,831,418 A | 11/1998 | Kitagawa | |
| 5,903,504 A | 5/1999 | Chevallier et al. | |
| 5,917,716 A | 6/1999 | Cho | |
| 5,963,438 A | 10/1999 | Chen | |
| 5,991,171 A | 11/1999 | Cheng | |
| 6,002,183 A | 12/1999 | Iversen et al. | |
| 6,002,318 A | 12/1999 | Werner et al. | |
| 6,038,148 A | 3/2000 | Farrington et al. | |
| 6,043,705 A | 3/2000 | Jiang | |
| 6,091,616 A | 7/2000 | Jacobs et al. | |
| 6,101,104 A | 8/2000 | Eng | |
| 6,137,373 A | 10/2000 | Mori | |
| 6,141,232 A | 10/2000 | Weinmeier et al. | |
| 6,157,180 A | 12/2000 | Kuo | |
| 6,157,282 A | 12/2000 | Hopkinson | |
| 6,169,674 B1 | 1/2001 | Owen | |
| 6,191,964 B1 | 2/2001 | Boylan et al. | |
| 6,198,647 B1 | 3/2001 | Zhou et al. | |
| 6,232,832 B1 | 5/2001 | Kirkpatrick, II | |
| 6,236,194 B1 | 5/2001 | Manabe et al. | |
| 6,252,781 B1 | 6/2001 | Rinne et al. | |
| 6,304,463 B1 | 10/2001 | Krugly | |
| 6,320,768 B1 * | 11/2001 | Pham | H02M 1/08 363/41 |
| 6,335,872 B1 | 1/2002 | Zhou et al. | |
| 6,343,026 B1 | 1/2002 | Perry | |
| 6,426,884 B1 | 7/2002 | Sun | |
| 6,456,511 B1 | 9/2002 | Wong | |
| 6,469,478 B1 | 10/2002 | Curtin | |
| 6,472,852 B1 | 10/2002 | Lethellier | |
| 6,487,097 B2 | 11/2002 | Popescu | |
| 6,490,183 B2 | 12/2002 | Zhang | |
| 6,492,890 B1 | 12/2002 | Woznlczka | |
| 6,496,395 B2 | 12/2002 | Tokunaga et al. | |
| 6,545,534 B1 | 4/2003 | Mehr | |
| 6,563,719 B1 | 5/2003 | Hua | |
| 6,594,163 B2 | 7/2003 | Tsai | |
| 6,617,948 B2 | 9/2003 | Kuroshima et al. | |
| 6,618,274 B2 | 9/2003 | Boylan et al. | |
| 6,643,151 B1 | 11/2003 | Nebrigic et al. | |
| 6,664,660 B2 | 12/2003 | Tsai | |
| 6,697,955 B1 | 2/2004 | Malik et al. | |
| 6,707,650 B2 | 3/2004 | Diallo et al. | |
| 6,711,039 B2 | 3/2004 | Brkovic | |
| 6,734,775 B2 | 5/2004 | Chung | |
| 6,760,235 B2 | 7/2004 | Lin et al. | |
| 6,798,177 B1 | 9/2004 | Liu et al. | |
| 6,839,246 B1 | 1/2005 | Zhang et al. | |
| 6,850,048 B2 | 2/2005 | Orr et al. | |
| 6,998,901 B2 | 2/2006 | Lee | |
| 7,012,413 B1 | 3/2006 | Ye | |
| 7,046,492 B2 | 5/2006 | Fromm et al. | |
| 7,061,212 B2 | 6/2006 | Phadke | |
| 7,095,215 B2 | 8/2006 | Liu et al. | |
| 7,129,808 B2 | 10/2006 | Roebke et al. | |
| 7,164,584 B2 | 1/2007 | Walz | |
| 7,183,727 B2 | 2/2007 | Ferguson et al. | |
| 7,199,563 B2 | 4/2007 | Ikezawa | |
| 7,202,644 B2 | 4/2007 | Nitta et al. | |
| 7,206,210 B2 | 4/2007 | Harnett et al. | |
| 7,224,590 B2 | 5/2007 | Lin | |
| 7,227,754 B2 | 6/2007 | Griesinger et al. | |
| 7,242,168 B2 | 7/2007 | Müller et al. | |
| 7,286,376 B2 | 10/2007 | Yang | |
| 7,304,828 B1 | 12/2007 | Shvartsman | |
| 7,339,804 B2 | 3/2008 | Uchida | |
| 7,369,024 B2 | 5/2008 | Yargole et al. | |
| 7,443,278 B2 | 10/2008 | Kawahata et al. | |
| 7,480,158 B2 | 1/2009 | Moromizato et al. | |
| 7,515,005 B2 | 4/2009 | Dan | |
| 7,564,706 B1 | 7/2009 | Herbert | |
| 7,577,539 B2 | 8/2009 | Hubanks et al. | |
| 7,579,901 B2 | 8/2009 | Yamashita | |
| 7,589,982 B2 | 9/2009 | Wang et al. | |
| 7,602,273 B2 | 10/2009 | Yoshikawa | |
| 7,616,459 B2 | 11/2009 | Huynh et al. | |
| 7,616,464 B2 | 11/2009 | Phadke et al. | |
| 7,663,896 B2 | 2/2010 | Na | |
| 7,730,981 B2 | 6/2010 | McCabe et al. | |
| 7,742,318 B2 | 6/2010 | Fu et al. | |
| 7,773,392 B2 | 8/2010 | Matsumoto | |
| 7,786,712 B2 | 8/2010 | Williams | |
| 7,847,519 B2 | 12/2010 | Ho | |
| 7,884,317 B2 | 2/2011 | Casper | |
| 7,893,804 B2 | 2/2011 | Kaveh Ahangar et al. | |
| 7,933,131 B2 | 4/2011 | Cho et al. | |
| 8,009,004 B2 | 8/2011 | Ahangar et al. | |
| 8,040,699 B2 | 10/2011 | Huynh et al. | |
| 8,067,992 B2 | 11/2011 | Chen et al. | |
| 8,072,195 B2 | 12/2011 | Aan De Stegge et al. | |
| 8,102,162 B2 | 1/2012 | Moussaoui et al. | |
| 8,233,293 B2 | 7/2012 | Selvaraju et al. | |
| 8,279,631 B2 | 10/2012 | Yang | |
| 8,350,659 B2 | 1/2013 | Dziubek et al. | |
| 8,358,118 B2 | 1/2013 | Chen et al. | |
| 8,373,403 B1 | 2/2013 | Radovic | |
| 8,378,647 B2 | 2/2013 | Yonezawa et al. | |
| 8,508,195 B2 | 8/2013 | Uno | |
| 8,520,415 B1 | 8/2013 | Krishnamoorthy et al. | |
| 8,552,589 B2 | 10/2013 | Ghosh et al. | |
| 8,570,006 B2 | 10/2013 | Moussaoui et al. | |
| 8,649,128 B2 | 2/2014 | Wang et al. | |
| 8,710,820 B2 | 4/2014 | Parker | |
| 8,736,240 B2 | 5/2014 | Liu et al. | |
| 8,760,082 B2 | 6/2014 | Yang et al. | |
| 8,764,247 B2 | 7/2014 | Pattekar et al. | |
| 8,810,214 B2 | 8/2014 | Van Dijk et al. | |
| 8,824,167 B2 | 9/2014 | Hughes et al. | |
| 8,829,868 B2 | 9/2014 | Waltman et al. | |
| 8,866,551 B2 | 10/2014 | Lam et al. | |
| 8,873,263 B2 | 10/2014 | Feng et al. | |
| 8,885,308 B2 | 11/2014 | Waltman et al. | |
| 8,890,630 B2 | 11/2014 | Hughes | |
| 9,030,178 B2 | 5/2015 | Chang et al. | |

(56) References Cited

U.S. PATENT DOCUMENTS

| | | |
|---|---|---|
| 9,041,378 B1 | 5/2015 | Lam et al. |
| 9,106,142 B2 | 8/2015 | Huang et al. |
| 9,160,228 B1 | 10/2015 | Parker et al. |
| 9,230,726 B1 | 1/2016 | Parker et al. |
| 9,293,999 B1 | 3/2016 | Lam et al. |
| 9,419,538 B2 | 8/2016 | Furmanczyk et al. |
| 9,735,566 B1 | 8/2017 | Lam et al. |
| 9,742,183 B1 | 8/2017 | Lam et al. |
| 9,780,635 B1 | 10/2017 | Lam et al. |
| 2002/0015320 A1 | 2/2002 | Mochikawa et al. |
| 2002/0071300 A1 | 6/2002 | Jang et al. |
| 2003/0048644 A1 | 3/2003 | Nagai et al. |
| 2004/0125523 A1 | 7/2004 | Edwards et al. |
| 2004/0169498 A1 | 9/2004 | Goder et al. |
| 2004/0178776 A1 | 9/2004 | Hansen et al. |
| 2004/0178846 A1 | 9/2004 | Kuyel et al. |
| 2004/0207379 A1 | 10/2004 | Camara et al. |
| 2005/0122753 A1 | 6/2005 | Soldano |
| 2006/0039172 A1 | 2/2006 | Soldano |
| 2006/0071651 A1 | 4/2006 | Ito |
| 2006/0132105 A1 | 6/2006 | Prasad et al. |
| 2006/0132272 A1 | 6/2006 | Kitahara et al. |
| 2006/0208717 A1 | 9/2006 | Shimizu et al. |
| 2006/0212138 A1 | 9/2006 | Zhang |
| 2006/0220629 A1 | 10/2006 | Saito et al. |
| 2006/0227582 A1 | 10/2006 | Wei et al. |
| 2007/0152644 A1 | 7/2007 | Vinn |
| 2007/0257733 A1 | 11/2007 | Laletin |
| 2008/0024951 A1 | 1/2008 | Mortensen et al. |
| 2008/0031014 A1 | 2/2008 | Young |
| 2008/0111531 A1 | 5/2008 | Hasegawa et al. |
| 2008/0150670 A1 | 6/2008 | Chung et al. |
| 2008/0174396 A1 | 7/2008 | Choi et al. |
| 2008/0197724 A1 | 8/2008 | Cullen et al. |
| 2008/0303606 A1 | 12/2008 | Liu et al. |
| 2009/0067206 A1 | 3/2009 | Oguchi et al. |
| 2009/0128110 A1 | 5/2009 | DeLurio et al. |
| 2009/0154204 A1 | 6/2009 | Taylor |
| 2009/0167432 A1 | 7/2009 | van den Heuvel |
| 2009/0174381 A1 | 7/2009 | Ojanen et al. |
| 2009/0213623 A1 | 8/2009 | Yang |
| 2009/0231029 A1 | 9/2009 | Randlett |
| 2009/0237057 A1 | 9/2009 | Dishman et al. |
| 2009/0256547 A1 | 10/2009 | Akyildiz et al. |
| 2009/0273431 A1 | 11/2009 | Hurst |
| 2009/0295350 A1 | 12/2009 | Yamada |
| 2009/0302775 A1 | 12/2009 | Alexandrov |
| 2009/0321045 A1 | 12/2009 | Hernon et al. |
| 2009/0321046 A1 | 12/2009 | Hernon et al. |
| 2010/0008112 A1 | 1/2010 | Feng et al. |
| 2010/0014330 A1 | 1/2010 | Chang et al. |
| 2010/0117715 A1 | 5/2010 | Ariyama |
| 2010/0176755 A1 | 7/2010 | Hoadley et al. |
| 2010/0253309 A1 | 10/2010 | Xi et al. |
| 2010/0283442 A1 | 11/2010 | Nakashima |
| 2011/0090038 A1 | 4/2011 | Perchlik |
| 2011/0103105 A1 | 5/2011 | Wei et al. |
| 2011/0169471 A1 | 7/2011 | Nagasawa |
| 2011/0255315 A1 | 10/2011 | Ono |
| 2011/0317453 A1 | 12/2011 | Fan et al. |
| 2012/0268227 A1 | 10/2012 | Howes et al. |
| 2013/0021008 A1 | 1/2013 | Hume et al. |
| 2013/0049918 A1 | 2/2013 | Fu et al. |
| 2013/0121043 A1 | 5/2013 | Pietkiewicz |
| 2013/0201631 A1 | 8/2013 | Parker et al. |
| 2013/0245854 A1 | 9/2013 | Rinne et al. |
| 2013/0299148 A1 | 11/2013 | Hernon et al. |
| 2014/0015629 A1 | 1/2014 | Zeng et al. |
| 2014/0118946 A1 | 5/2014 | Tong et al. |
| 2014/0192561 A1 | 7/2014 | Plesnik |
| 2014/0254206 A1 | 9/2014 | Ou et al. |
| 2014/0292288 A1 | 10/2014 | Yan et al. |
| 2014/0327417 A1 | 11/2014 | Zhu et al. |
| 2015/0137412 A1 | 5/2015 | Schalansky |
| 2015/0229149 A1 | 8/2015 | Fahlenkamp et al. |
| 2016/0190948 A1 | 6/2016 | Yang et al. |
| 2016/0237790 A1* | 8/2016 | Williams ............... E21B 47/18 |
| 2016/0261194 A1 | 9/2016 | Lam et al. |
| 2017/0358979 A1 | 12/2017 | Lam et al. |

FOREIGN PATENT DOCUMENTS

| | | |
|---|---|---|
| CN | 201219235 Y | 4/2009 |
| CN | 103051184 A | 4/2013 |
| CN | 103414334 A | 11/2013 |
| CN | 103582997 A | 2/2014 |
| CN | 103596343 A | 2/2014 |
| CN | 104704742 A | 6/2015 |
| EP | 1 933 340 A1 | 6/2008 |
| GB | 1071469 A1 | 6/1967 |
| GB | 1114013 A | 5/1968 |
| JP | 55-1761 A | 1/1980 |
| JP | 55-130208 A | 10/1980 |
| JP | 62-32714 A | 2/1987 |
| JP | 2567069 B2 | 6/1993 |
| JP | 8-78252 A | 3/1996 |
| JP | 2001-320250 A | 11/2001 |
| JP | 2002-76799 A | 3/2002 |
| JP | 2002-335674 A | 11/2002 |
| JP | 2003-173913 A | 6/2003 |
| JP | 2007-215359 A | 8/2007 |
| JP | 2007-263944 A | 10/2007 |
| JP | 2008-185398 A | 8/2008 |
| JP | 2009-81952 A | 4/2009 |
| JP | 2009-100120 A | 5/2009 |
| JP | 2009-106012 A | 5/2009 |
| JP | 5030216 B2 | 9/2012 |
| KR | 10-2007-0118409 A | 12/2007 |
| KR | 10-2008-0019196 A | 3/2008 |
| KR | 10-2008-0101784 A | 11/2008 |
| KR | 10-2009-0075465 A | 7/2009 |
| KR | 10-2013-0026714 A | 3/2013 |
| WO | 99/41957 A1 | 8/1999 |
| WO | 01/22444 A1 | 3/2001 |
| WO | 02/097974 A2 | 12/2002 |
| WO | 2011/123680 A2 | 10/2011 |
| WO | 2012/100810 A1 | 8/2012 |
| WO | 2012/116263 A1 | 8/2012 |
| WO | 2017/015143 A1 | 1/2014 |
| WO | 2014/039982 A1 | 3/2014 |
| WO | 2014/103298 A1 | 7/2014 |
| WO | 2014/152415 A1 | 9/2014 |

OTHER PUBLICATIONS

"Application Note 664 Feedback Isolation Augments Power-Supply Safety and Performance," Maxim Integrated, Jan. 22, 2001, retrieved from https://www.maximintegrated.com/en/app-notes/index.mvp/id/664, 6 pages.

"Buck converter," retrieved from http://en.wikipedia.org/wiki/Buck_converter, on Jun. 23, 2011, 14 pages.

"EMI Suppression Filters (EMIFIL®) for AC Power Lines," Murata Manufacturing Co., Ltd., Cat.No. C09E-14, downloaded on Feb. 21, 2014, 27 pages.

"Maximum Flexible Power (MFP) Single Output Point of Load: Technical Preview—3-6 VDC IN, 7 Amp, Non-Isolated DC/DC Converter," Crane Aerospace & Electronics Power Solutions, 2010, 17 pages.

"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.

"Synchronous Rectification Aids Low-Voltage Power Supplies," Maxim Integrated Products, retrieved from http://www.maxim-ic.com/app-notes/index.mvp/id/652, on Jun. 22, 2011, 6 pages.

Advisory Action, dated Aug. 14, 2017, for U.S. Appl. No. 14/787,565, Lam et al., "Dynamic Maneuvering Configuration for Multiple Control Modes in a Unified Servo System," 3 pages.

Amendment, filed Dec. 16, 2016, for U.S. Appl. No. 14/787,565, Lam et al., "Dynamic Maneuvering Configuration for Multiple Control Modes in a Unified Servo System," 10 pages.

(56) References Cited

OTHER PUBLICATIONS

Amendment, filed Jul. 14, 2017, for U.S. Appl. No. 15/178,968, Lam et al., "Dynamic Sharing Average Current Mode Control for Active-Reset and Self-Driven Synchronous Rectification for Power Converters," 11 pages.
Amendment, filed Jul. 24, 2017, for U.S. Appl. No. 14/787,565, Lam et al., "Dynamic Maneuvering Configuration for Multiple Control Modes in a Unified Servo System," 9 pages.
Amendment, filed Mar. 20, 2017, for U.S. Appl. No. 15/374,116, Lam et al., "Proactively Operational Over-Voltage Protection Circuit," 3 pages.
Amendment, filed Mar. 20, 2017, for U.S. Appl. No. 15/376,329, Lam et al., "Proactively Operational Over-Voltage Protection Circuit," 2 pages.
Beta Dyne, "Synchronous Rectification, " Application Note DC-006, DC/DC Converters, 2002, 3 pages.
Bottrill, "The Effects of Turning off a Converter with Self-Driven Synchronous Rectifiers, " Power Guru, May 1, 2007, retrieved from http://www.powerguru.org/the-effects-of-turning-off-a-converter-with-self-driven-synchronous-rectifiers/ Jul. 10, 2015, 6 pages.
Chinese Office Action with English Translation dated May 22, 2015, for CN Application No. 201280016631.1, 15 pages.
Coates, "Power supplies—3.0 Switched Mode Power Supplies," www.learnabout-electronics.org, 2007-2013, 20 pages.
Cuon et al., "Dynamic Maneuvering Configuration of Multiple Control Modes in a Unified Servo System, " Amendment filed Mar. 6, 2015, for U.S. Appl. No. 14/333,705, 11 pages.
Dixon, "Average Current Mode Control of Switching Power Supplies, " Unitrode Application Note, Texas Instruments Inc., pp. 356-369,1999. (15 pages).
eCircuit Center, "Op Amp Input Offset Adjustment," 2002, retrieved from http://www.ecircuitcenter.com/Circuits/op_voff/op_voff2.htm on Mar. 26, 2012, 3 pages.
Erickson et al., *Fundamentals of Power Electronics*, Kluwer Academic Publishers, New York City, New York, USA, 2004, Chapter 12, "Current Programmed Control," pp. 439-482. (46 pages).
European Search Report, dated Jul. 5, 2017, for EP Application No. 15822324.8-1804 / 3170057, 11 pages.
Extended European Search Report, dated Apr. 15, 2016 for European Application No. 13835620.9, 7 pages.
Final Office Action, dated Apr. 27, 2017, for U.S. Appl. No. 14/787,565, Lam et al., "Dynamic Maneuvering Configuration for Multiple Control Modes in a Unified Servo System," 10 pages.
Final Office Action, dated Jun. 1, 2017, for U.S. Appl. No. 15/178,968, Lam et al., "Dynamic Sharing Average Current Mode Control for Active-Reset and Self-Driven Synchronous Rectification for Power Converters," 16 pages.
Furmanczyk et al., "AC/DC Power Conversion System and Method of Manufacture of the Same," Notice of Allowance, dated Apr. 25, 2016, for U.S. Appl. No. 14/001,312, 9 pages.
Garcia et al., "Optimal Design for Natural Convection-Cooled Rectifiers, " 18th International Telecommunications Energy Conference, Boston, Oct. 6-10, 1996, 10 pages.
Hughes, "Self Synchronizing Power Converter Apparatus and Method Suitable for Auxiliary Bias for Dynamic Load Applications," Notice of Allowance dated May 14, 2014, for U.S. Appl. No. 13/185,217, 10 pages.
Hughes, "Oscillator Apparatus and Method With Wide Adjustable Frequency Range," Office Action dated Jun. 5, 2013, for U.S. Appl. No. 13/185,152, 17 pages.
Hughes, "Oscillator Apparatus and Method With Wide Adjustable Frequency Range," Amendment filed Oct. 7, 2013, for U.S. Appl. No. 13/185,152, 15 pages.
Hughes, "Oscillator Apparatus and Method With Wide Adjustable Frequency Range," Office Action dated Jan. 28, 2014, for U.S. Appl. No. 13/185,152, 15 pages.
Hughes, "Oscillator Apparatus and Method With Wide Adjustable Frequency Range," Amendment filed Apr. 24, 2014, for U.S. Appl. No. 13/185,152, 8 pages.
Hughes, "Oscillator Apparatus and Method With Wide Adjustable Frequency Range," Notice of Allowance dated Jul. 14, 2014, for U.S. Appl. No. 13/185,152, 12 pages.
Hume et al., "Power Converter Apparatus and Method With Compensation for Light Load Conditions," Office Action dated Nov. 6, 2013, for U.S. Appl. No. 13/185,142, 11 pages.
International Search Report and Written Opinion of the International Searching Authority, dated May 31, 2016, for International Application No. PCT/US2016/018628, 12 pages.
International Search Report and Written Opinion of the International Searching Authority, dated Jun. 21, 2016, for International Application No. PCT/US2016/019520, 14 pages.
International Search Report and Written Opinion of the International Searching Authority, dated Aug. 31, 2015 for International Application No. PCT/US2015/033321, 9 pages.
International Search Report and Written Opinion, dated Aug. 18, 2017, for International Application No. PCT/US2017/035932, 12 pages.
International Search Report and Written Opinion, dated Oct. 12, 2016, for International Application No. PCT/US2016/042582, 11 pages.
International Search Report, dated Aug. 12, 2002, for PCT/US01/50033, 1 page.
International Search Report, dated Dec. 20, 2013, for International Application No. PCT/US2013/058784, 3 pages.
International Search Report, dated Jun. 8, 2011, for PCT/US2010/052705, 3 pages.
International Search Report, dated Jun. 8, 2011, for PCT/US2010/052707, 3 pages.
International Search Report, dated Oct. 14, 2011, for International Application No. PCT/US2011/030778, 3 pages.
Irving et al., "Analysis and Design Optimization of Magnetic-Feedback Control Using Amplitude Modulation, " *IEEE Transactions on Power Electronics* 24(2):426-433, Feb. 2009. (9 pages).
Jovanovié et al., "Design Considerations for Forward Converter with Synchronous Rectifiers, " Power Conversion Proceedings, pp. 340-350, Oct. 1993.
King et al., "Active Clamp Control Boosts Forward Converter Efficiency, " Power Electronics Technology, pp. 52-55, Jun. 2003.
Kristjansson et al., "Solutions to Today's Low Voltage Power Design Challenges Using High-Efficiency, Non-Isolated Point of Load Converters: A Discussion of the Interpoint™ MFP Series™ Point of Load Converter," Crane Aerospace & Electronics, Power Solutions—Interpoint Products, Redmond, WA, Oct. 2011, Revised Jan. 2012, 25 pages.
Kuehny et al., "Output Filter for Use With Power Converters, for Example DC/DC Power Converters, for Instance Interpoint MFP POL DC/DC Power Converters," U.S. Appl. No. 61/547,327, filed Oct. 14, 2011, 14 pages.
Lam et al., "Automatic Enhanced Self-Driven Synchronous Rectification for Power Converters," Notice of Allowance, for U.S. Appl. No. 14/848,859, dated Dec. 10, 2015, 29 pages.
Lam et al., "Automatic Enhanced Self-Driven Synchronous Rectification for Power Converters for Wide Input Range and High Output Voltage Without Tertiary Winding," U.S. Appl. No. 62/193,755, filed Jul. 17, 2015, 53 pages.
Lam et al., "Dynamic Maneuvering Configuration for Multiple Control Modes in a Unified Servo System," Office Action dated Dec. 23, 2014, for U.S. Appl. No. 14/333,705, 6 pages.
Lam et al., "Impedance Compensation for Operational Amplifiers Used in Variable Environments," Office Action dated Feb. 7, 2014, for U.S. Appl. No. 13/609,107, 11 pages.
Lam et al., "Impedance Compensation for Operational Amplifiers Used in Variable Environments," Amendment filed May 6, 2014, for U.S. Appl. No. 13/609,107, 12 pages.
Lam et al., "Impedance Compensation for Operational Amplifiers Used in Variable Environments," Notice of Allowance dated Jun. 27, 2014, for U.S. Appl. No. 13/609,107, 9 pages.
Manfredi et al., "Additive Manufacturing of Al Alloys and Aluminium Matrix Composites (AMCs)," in Monteiro (ed.), *Light Metal Alloys Applications*, InTech, Jun. 11, 2014, 32 pages.
Mappus, "Synchronous Rectification for Forward Converters, " Fairchild Semiconductor Power Seminar 2010-2011, 19 pages.

(56) References Cited

OTHER PUBLICATIONS

Merriam-Webster, "Directly," retrieved from http://www.merriam-webster.com/dictionary/directly, on Nov. 6, 2012, 1 page.
Mitsuya, "Basics of Noise Countermeasures—Lesson 14: Using Common Mode Choke Coils for Power Supply Lines," Murata Manufacturing Co., Ltd., Oct. 28, 2014, retrieved on Feb. 4, 2015, from http://www.murata.com/en-eu/products/emiconfun/emc/2014/10/28/en-20141028-pl, 3 pages.
Ng, "Implementing Constant Current Constant Voltage AC Adapter by NCP1200 and NCP4300A," Application Note, Publication Order No. AND8042/D, Semiconductor Components Industries, Feb. 2001, 12 pages.
Nguyen et al., "Nulling Input Offset Voltage of Operational Amplifiers," Mixed Signal Products, Texas Instruments—Application Report SLOA045, Aug. 2000, pp. 1-15.
Notice for Reasons for Rejections from the Japanese Patent Office with English Translation, dated Apr. 18, 2016, for Japanese Application No. 2015-531290, 5 pages.
Notice of Allowance dated Apr. 20, 2017 for Lam et al., "Proactively Operational Over-Voltage Protection Circuit," U.S. Appl. No. 15/376,329, 8 pages.
Notice of Allowance dated Apr. 24, 2017 for Lam et al., "Proactively Operational Over-Voltage Protection Circuit," U.S. Appl. No. 15/374,116, 9 pages.
Notice of Allowance, dated Jul. 28, 2017, for U.S. Appl. No. 15/178,968, Lam et al., "Dynamic Sharing Average Current Mode Control for Active-Reset and Self-Driven Synchronous Rectification for Power Converters," 5 pages.
Notice of Allowance, dated Sep. 25, 2017, for U.S. Appl. No. 14/787,565, Lam et al., "Dynamic Maneuvering Configuration for Multiple Control Modes in a Unified Servo System," 5 pages.
Office Action, dated Mar. 15, 2017, for U.S. Appl. No. 15/374,116, Lam et al., "Proactively Operational Over-Voltage Protection Circuit," 6 pages.
Office Action, dated Mar. 7, 2017, for U.S. Appl. No. 15/376,329, Lam et al., "Proactively Operational Over-Voltage Protection Circuit," 6 pages.
Office Action, dated Sep. 19, 2016, for U.S. Appl. No. 14/787,565, Lam et al., "Dynamic Maneuvering Configuration for Multiple Control Modes in a Unified Servo System," 9 pages.
Ou et al., "Magnetic Feedback Ranks High in Military Converters, " *Power Electronics Technology*:14-19, Jul. 2005. (4 pages).
Parker et al., "Integrated Tri-State Electromagnetic Interference Filter and Line Conditioning Module," Office Action dated Apr. 24, 2015, for U.S. Appl. No. 14/632,818, 11 pages.
Parker et al., "Transformer-Based Power Converters With 3D Printed Microchannel Heat Sink," Office Action dated Apr. 16, 2015, for U.S. Appl. No. 14/627,556, 9 pages.
Parker, "Switched Capacitor Hold-Up Scheme for Constant Boost Output Voltage," Office Action dated Mar. 28, 2012, for U.S. Appl. No. 12/751,067, 16 pages.
Parker, "Switched Capacitor Hold-Up Scheme for Constant Boost Output Voltage," Amendment filed Jul. 30, 2012, for U.S. Appl. No. 12/751,067, 18 pages.
Parker, "Switched Capacitor Hold-Up Scheme for Constant Boost Output Voltage," Office Action dated Nov. 16, 2012, for U.S. Appl. No. 12/751,067, 20 pages.
Parker, "Switched Capacitor Hold-Up Scheme for Constant Boost Output Voltage," Amendment filed Jan. 16, 2013, for U.S. Appl. No. 12/751,067, 15 pages.
Parker, "Switched Capacitor Hold-Up Scheme for Constant Boost Output Voltage," Amendment filed Feb. 15, 2013, for U.S. Appl. No. 12/751,067, 15 pages.
Parker, "Switched Capacitor Hold-Up Scheme for Constant Boost Output Voltage," Office Action dated Jul. 30, 2013, for U.S. Appl. No. 12/751,067, 18 pages.
Parker, "Switched Capacitor Hold-Up Scheme for Constant Boost Output Voltage," Amendment filed Oct. 30, 2013, for U.S. Appl. No. 12/751,067, 19 pages.
Parker, "Switched Capacitor Hold-Up Scheme for Constant Boost Output Voltage," Notice of Allowance dated Feb. 3, 2014, for U.S. Appl. No. 12/751,067, 11 pages.
Parker, "Transformer-Based Power Converters With 3D Printed Microchannel Heat Sink, " Office Action, dated Aug. 3, 2015, for U.S. Appl. No. 14/627,556, 11 pages.
Pascu, "Error Amplifier with Forced Equilibrium Adaptor," Kepco, Inc., retrieved from http://www.kepcopower.com/equibm2.htm#fig2, dated May 22, 2014, 8 pages.
Peter, "Synchronous rectifier in DC/DC converters, " Oct. 5, 2009, retrieved from http://www.posterus.sk/?p=2535, on Jul. 10, 2015, 11 pages.
Plesnik, "A New Method for Driving Synchronous Rectifiers, " IEICE/IEEE INTELEC'03, Oct. 19-23, Yokohama, Japan, pp. 274-281, 2003.
Preliminary Amendment, filed Oct. 28, 2015, for U.S. Appl. No. 14/787,565, Lam et al., "Dynamic Maneuvering Configuration for Multiple Control Modes in a Unified Servo System," 6 pages.
Rubasinghe, "Use an op amp as a set/reset flip-flop," EDN:45-46, 2012.
Shrisavar, "Introduction to Power Management," Texas Instruments, Biracha Digital Power Ltd., 2014, 37 pages.
Texas Instruments, "AN-72 the LM3900: A New Current-Differencing Quad of Plus of Minus Input Amplifiers," Lit. No. SNOA653, May 2, 2004, 48 pages.
Voltage Comparator Information and Circuits, Feb. 26, 2015, URL=http://home.cogeco.ca/~rpaisley4/Comparators.html, download date Jun. 7, 2017, 22 pages.
Waltman et al., "Input Control Apparatus and Method With Inrush Current, Under and Over Voltage Handling," Office Action dated Jun. 17, 2014, for U.S. Appl. No. 13/185,210, 8 pages.
Waltman et al., "Power Converter Apparatus and Method With Compensation for Current Limit/Current Share Operation," Office Action dated Dec. 17, 2013, for U.S. Appl. No. 13/185,172, 15 pages.
Waltman et al., "Power Converter Apparatus and Method With Compensation for Current Limit/Current Share Operation," Amendment filed Mar. 17, 2014, for U.S. Appl. No. 13/185,172, 16 pages.
Waltman et al., "Power Converter Apparatus and Method With Compensation for Current Limit/Current Share Operation," Notice of Allowance dated May 8, 2014, for U.S. Appl. No. 13/185,172, 10 pages.
Waltman et al., "Power Converter Apparatus and Methods," U.S. Appl. No. 61/508,937, filed Jul. 18, 2011, 139 pages.
West, "Analogue Set-Reset Latch," *Electronics Today International* 7(11):76, 1983.
Written Opinion of the International Searching Authority, dated Oct. 14, 2011, for PCT/US2011/030778, 5 pages.
Written Opinion of the International Searching Authority, dated Dec. 20, 2013, for PCT/US2013/058784, 4 pages.
Xing et al., "Power System Architecture with Back-Up Power for Servers, " ERC Program of the National Science Foundation, 5 pages. (The year of publication is sufficiently earlier than the effective U.S. filing date and any foreign priority date so that the particular month of publication is not in issue.).
Zhang, "Chapter Two Synchronous Rectification," Synchronous Rectification, pp. 9-72, PDF created Feb. 20, 1997.
Extended European Search Report, dated Dec. 14, 2017 for European Application No. 12750065.0-1809, 8 pages.
Lam et al., "Dynamic Sharing Average Current Mode Control for Active-Reset and Self-Driven Synchronous Rectification for Power Converters," Amendment filed Feb. 15, 2017 for U.S. Appl. No. 15/178,968, 22 pages.
Notice of Allowance, dated Nov. 16, 2017, for U.S. Appl. No. 15/652,849, Lam et al., "Dynamic Sharing Average Current Mode Control for Active-Reset and Self-Driven Synchronous Rectification for Power Converters," 10 pages.
Office Action dated Nov. 18, 2016 for U.S. Appl. No. 15/178,968, Lam et al., "Dynamic Sharing Average Current Mode Control for Active-Reset and Self-Driven Synchronous Rectification for Power Converters," 20 pages.

(56) References Cited

OTHER PUBLICATIONS

Supplemental Notice of Allowability, dated Nov. 1, 2017, for U.S. Appl. No. 14/787,565, Lam et al., "Dynamic Maneuvering Configuration for Multiple Control Modes in a Unified Servo System," 3 pages.

Chinese Office Action, dated Jan. 17, 2018, for Chinese Application No. 201580049344.4, 5 pages.

* cited by examiner

RADIATION TOLERANT, ANALOG LATCH PEAK CURRENT MODE CONTROL FOR POWER CONVERTERS

BACKGROUND

Technical Field

The present disclosure generally relates to controllers for power converters.

Description of the Related Art

DC/DC converters are a type of power supply which converts an input DC voltage to a different output DC voltage. Such converters typically include a transformer that is electrically coupled via a switching circuit between a voltage source and a load. Converters known as forward converters include at least one main switch connected between the voltage source and the primary winding of the transformer to provide forward power transfer to the secondary winding of the transformer when the switch is on and conducting. A metal oxide semiconductor field effect transistor (MOSFET) device is typically used for the one or more main switches.

Power converter designs are often constrained by various requirements, such as efficiency, input voltage range, output voltage, power density, and footprint area. These constraints require certain performance tradeoffs. For instance, achieving higher efficiencies may require a more narrow input voltage range. To further improve efficiencies, active-reset schemes and synchronous rectifications are often employed. These synchronous rectification schemes can either be active-control or self-driven.

Environments with high levels of ionizing radiation create special design challenges. A single charged particle can knock thousands of electrons loose, causing electronic noise and signal spikes. In the case of digital circuits, this can cause results which are inaccurate or unintelligible. This can be a particularly serious problem in the design of components for satellites, spacecraft, aircraft, power stations, etc.

BRIEF SUMMARY

A peak current mode control (PCMC) controller for a power converter, the power converter comprising one or more controllable switches that selectively electrically couples a power source to a load, may be summarized as including: a latch circuit comprising an analog comparator and a latching capacitor, the analog comparator comprising a first input node operatively coupled to the latching capacitor, a second input node operatively coupled to a latch circuit reference voltage circuit, and an output node; a peak current detector circuit comprising an analog comparator having a first input node operatively coupled to a current sensor circuit that, in operation, senses a current of the power converter, a second input node operatively coupled to an error control signal circuit, and an output node operatively coupled to the latching capacitor, in operation the peak current detector circuit compares a current sensor signal received from the current sensor circuit to an error control signal received from the error control signal circuit and, responsive to detecting that the current sensor signal exceeds the error control signal, causes the latching capacitor to discharge; a clock circuit comprising an analog comparator, in operation, the clock circuit generates a clock signal at a clock signal node and a charge signal at a charge signal node, the charge signal node being operatively coupled to the latching capacitor to selectively charge the latching capacitor; and a gate circuit comprising an analog comparator having a first input node operatively coupled to a gate circuit reference voltage circuit, a second input node operatively coupled to the clock signal node and to the output node of the analog comparator of the latch circuit via an OR-circuit, and an output node that, in operation, provides a control signal to the one or more controllable switches of the power converter.

The PCMC controller may further include a slope compensation circuit comprising an input node operatively coupled to the clock signal node, and an output node operatively coupled to the first input node of the analog comparator of the peak current detector circuit.

The PCMC controller may further include a current sensor circuit comprising a current transducer that, in operation, senses a current of the power converter.

The current transducer may include a transformer or a resistor. The OR-circuit may include a plurality of diodes. The analog comparator of the clock circuit may include first and second complementary output nodes, the clock signal may be generated at the first output node and the charge signal may be generated at the second output node. The output node of the peak current detector circuit may be operatively coupled to the latching capacitor via a diode. The charge signal node of the clock circuit may be operatively coupled to the latching capacitor via a diode and a resistor coupled together in series.

A power converter may be summarized as including: a transformer having a primary winding and a secondary winding, the primary winding electrically coupleable to an input voltage node and the secondary winding electrically coupleable to an output voltage node; a primary circuit electrically coupled to the primary winding, the primary winding comprising at least one controllable switch; and a peak current mode control (PCMC) controller, comprising: a latch circuit comprising an analog comparator and a latching capacitor, the analog comparator comprising a first input node operatively coupled to the latching capacitor, a second input node operatively coupled to a latch circuit reference voltage circuit, and an output node; a peak current detector circuit comprising an analog comparator having a first input node operatively coupled to a current sensor circuit that, in operation, senses a current of the power converter, a second input node operatively coupled to an error control signal circuit, and an output node operatively coupled to the latching capacitor, in operation the peak current detector circuit compares a current sensor signal received from the current sensor circuit to an error control signal received from the error control signal circuit and, responsive to detecting that the current sensor signal exceeds the error control signal, causes the latching capacitor to discharge; a clock circuit comprising an analog comparator, in operation, the clock circuit generates a clock signal at a clock signal node and a charge signal at a charge signal node, the charge signal node operatively coupled to the latching capacitor to selectively charge the latching capacitor; and a gate circuit comprising an analog comparator having a first input node operatively coupled to a gate circuit reference voltage circuit, a second input node operatively coupled to the clock signal and the output node of the analog comparator of the latch circuit via an OR-circuit, and an output node that, in operation, provides a control signal to the one or more controllable switches of the power converter.

The PCMC controller may further include a slope compensation circuit comprising an input node operatively coupled to the clock signal node, and an output node operatively coupled to the first input node of the analog comparator of the peak current detector circuit.

The power converter may further include a current sensor circuit comprising a current transducer that, in operation, senses a current of the power converter.

The output of the peak current detector circuit may be operatively coupled to the latching capacitor via a diode, and the charge signal of the clock circuit may be operatively coupled to the latching capacitor via a diode and a resistor coupled together in series.

A peak current mode control (PCMC) controller may be summarized as a PCMC controller for a power converter that, in operation, controls the power converter according to peak current mode control, the power converter comprising one or more controllable switches, the PCMC controller including: an analog latch circuit comprising an input and an output, the input operatively coupled to a latching capacitor; an analog peak current detector circuit comprising an output operatively coupled to the latching capacitor, in operation the analog peak current detector circuit compares a current sensor signal to an error control signal and, responsive to detecting that the current sensor signal exceeds the error control signal, causes the latching capacitor of the analog latch circuit to discharge; an analog clock circuit that, in operation, generates a clock signal and a charge signal, the charge signal operatively coupled to the latching capacitor to selectively charge the latching capacitor; and an analog gate circuit having an input operatively coupled to the clock signal and the output of the analog latch circuit via an OR-circuit, and an output that, in operation, provides a control signal to the one or more controllable switches of the power converter.

The PCMC controller may further include a slope compensation circuit comprising an input operatively coupled to the clock signal, and an output operatively coupled to the current sensor signal.

The PCMC controller may further include an analog current sensor circuit comprising a current transducer that, in operation, senses a current of the power converter.

The current transducer may include a transformer or a resistor. The OR-circuit may include a plurality of diodes. The analog clock circuit may include first and second complementary outputs, the clock signal may be generated by the first output and the charge signal may be generated by the second output. The output of the analog peak current detector circuit may be operatively coupled to the latching capacitor via a diode. The charge signal of the analog clock circuit may be operatively coupled to the latching capacitor via a diode and a resistor coupled together in series.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure provide peak current mode control (PCMC) circuitry for power converters using discrete analog components. As discussed further below with reference to the figures, in the implementations discussed herein, PCMC functionality for latching, set, reset, clocking, slope compensation, etc., is provided via use of analog components that advantageously provide improved performance, design flexibility, reliability and radiation tolerance.

Figure 1A:
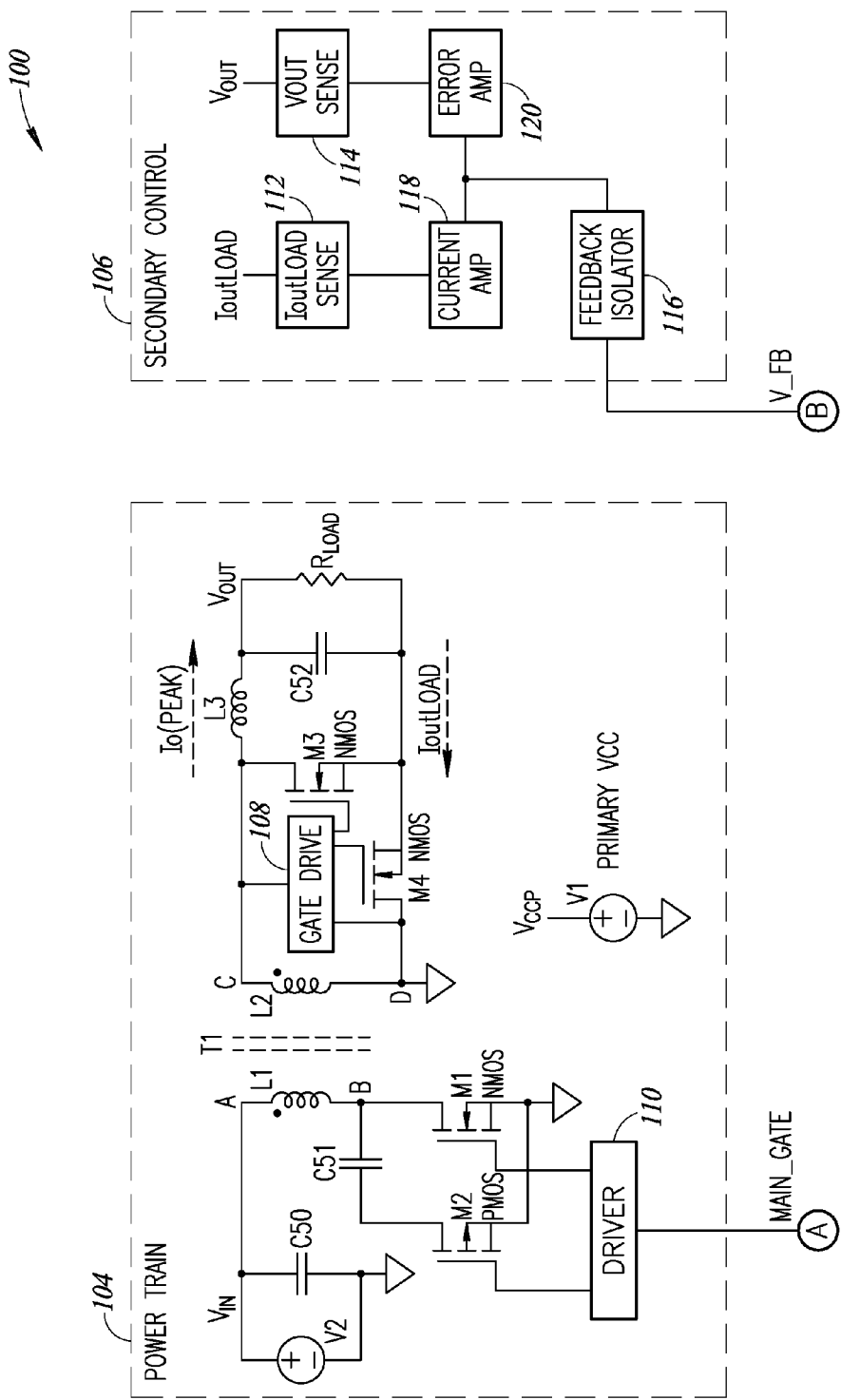
FIGS. 1A-1C are a schematic circuit diagram for a power converter that includes a peak current control mode (PCMC) controller, according to one illustrated implementation.
Figure 1B:
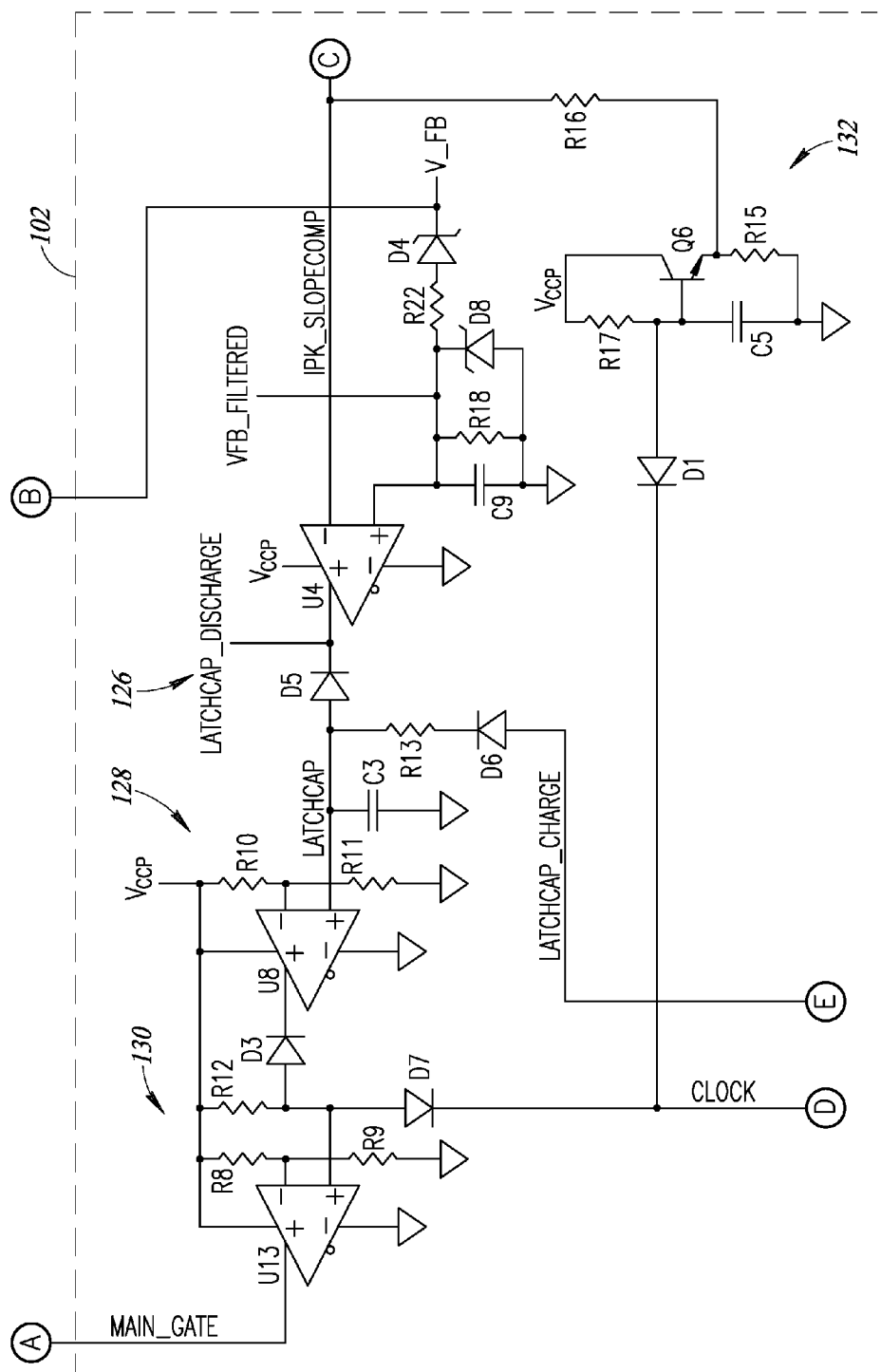
Figure 1C:
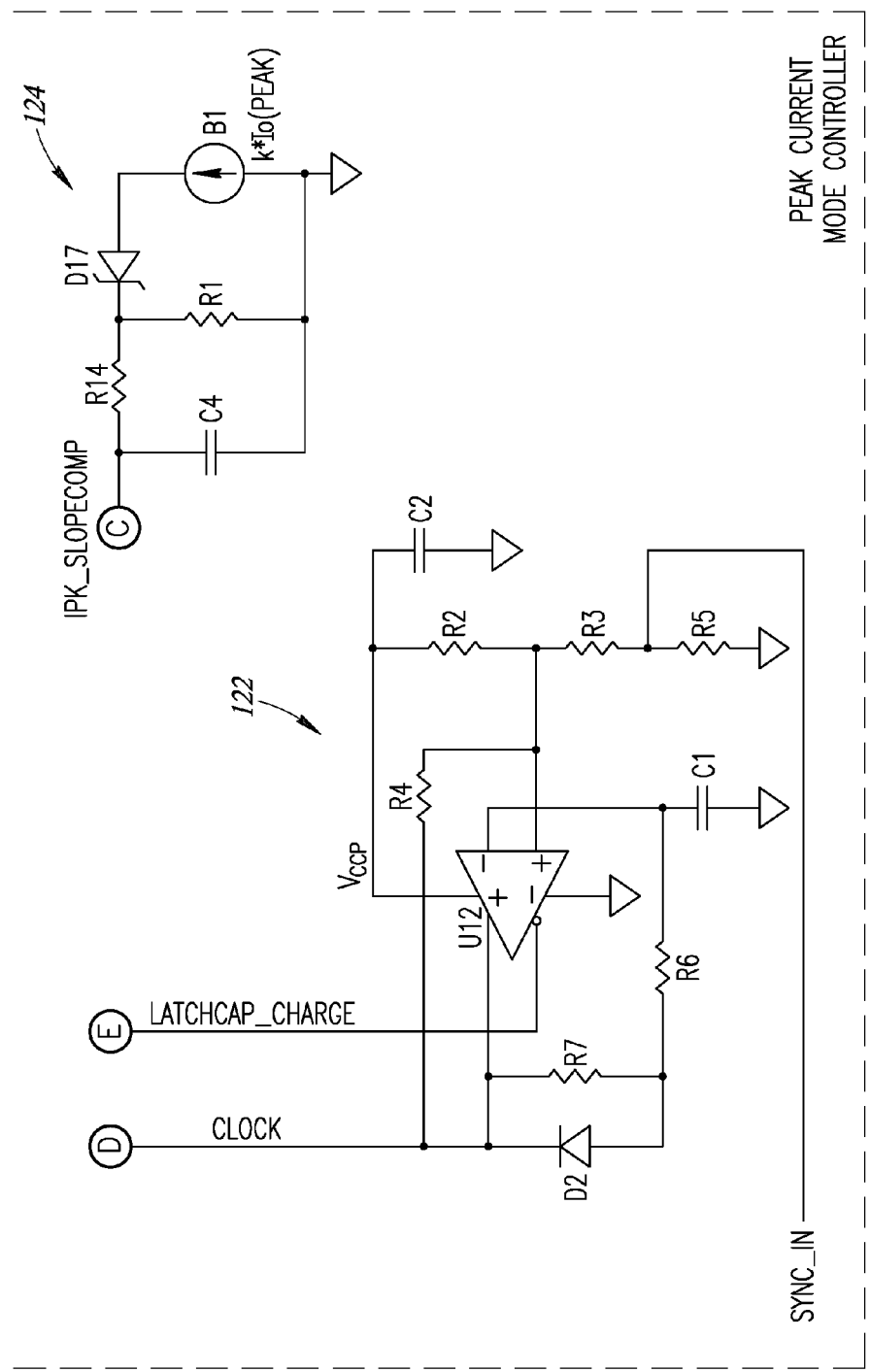

FIGS. 1A-1C show a schematic diagram for a power converter 100 that utilizes a PCMC controller 102 according to an example implementation of the present disclosure. In the illustrated implementation, the power converter 100 is a forward converter that utilizes an active reset scheme and self-driven synchronous rectification (SDSR). However, it should be appreciated that the PCMC controller 102 may be used with other types of power converters as well. Generally, the power converter 100 includes the PCMC controller or control circuitry 102, a power train circuit 104, and an isolated secondary control or feedback circuit 106, also referred to herein as an error control signal circuit. Initially, a discussion of the overall operation of the power converter 100 is provided. Then, the PCMC controller 102 is described in further detail.

A potential limitation of forward converters is that it may be necessary to reset the transformer core to prevent saturation (i.e., discharge the magnetizing current of the transformer during the off period of the main switch). This limitation results from the unipolar character of the transformer core excitation. Techniques exist for resetting the transformer of a forward converter. One such technique is to include a resistor-capacitor-diode (RCD) network in parallel with the primary winding. The RCD network clamps the voltage on the switch to the minimal peak voltage consistent with a given source voltage and switch duty cycle, thereby eliminating the need for dead time while allowing for a wide range of duty cycles. This tends to reduce the voltage stress applied to the switch. Nevertheless, this transformer resetting technique reduces the efficiency of the converter due to the dissipation of the magnetizing energy accumulated in the transformer during the on period of the switch. Instead of being recycled, this magnetizing energy is partially converted into heat by the RCD network.

Another method of transformer resetting is to use a series connection of a capacitor and an auxiliary switch connected across the transformer winding either on the primary side or on the secondary side (referred to as an "active clamp" or "active reset"). When the main switch is turned off, the auxiliary switch is turned on, and vice versa. Thus, magnetizing energy in the transformer is transferred to the clamping capacitor, and the clamping capacitor resonates with the magnetizing inductance to maintain the necessary level of reset voltage. This active clamp reset provides non-dissipative reset of the transformer and minimal voltage stress on the main switch under steady state conditions as dead time is almost zero. For this reason, the active clamp method is compatible with self-driven synchronous rectification.

In switching power supply circuits employing synchronous rectifiers, the diodes are replaced by power transistors to obtain a lower on-state voltage drop. The synchronous rectifier generally uses n-channel MOSFETs rather than diodes to avoid the turn-on voltage drop of diodes which can be significant for low output voltage power supplies. The transistors are biased to conduct when a diode would have been conducting from anode to cathode, and conversely, are gated to block current when a diode would have been blocking from cathode to anode. Although MOSFETs usually serve this purpose, bipolar transistors and other active semiconductor switches may also be suitable.

In these synchronous rectifier circuits, the gate signals can be self-driven, i.e., the gate signal can be tied to the power circuit, or controlled-driven, i.e., the gate signal is derived from some point in the circuit and goes through some active processing circuit before being fed to the MOSFET gate driver. In a power converter, the synchronous rectifier which conducts during the non-conducting period of the main power switch (or switches) may be referred to as a freewheeling or "catch" synchronous rectifier. The synchronous rectifier which conducts during the conducting period of the main power switch (switches) may be referred to as a forward synchronous rectifier.

In the example power converter 100 of FIGS. 1A-1C, a DC voltage input V2 that provides an input voltage $V_{IN}$ is connected to a primary winding L1 of a transformer T1 by a primary MOSFET power switch M1. An input capacitor C50 is provided across the input voltage $V_{IN}$ and a reference node (e.g., ground). A clamp circuit arrangement is also provided to limit the reset voltage. In particular, the MOSFET power switch M1 is shunted by a series connection of a clamp capacitor C51 and an auxiliary MOSFET switch device M2. In the illustrated implementation, the switch M1 is an NMOS device and the switch M2 is a PMOS device. The conducting intervals of M1 and M2 are mutually exclusive. The voltage inertia of the capacitor C51 limits the amplitude of the reset voltage appearing across the magnetizing inductance during the non-conducting interval of the MOSFET power switch M1. An internal primary side voltage source V1 is used to provide a voltage $V_{CCP}$ to various components of the power converter 100.

A secondary winding L2 of the transformer T1 is connected to an output lead $V_{out}$ through a synchronous rectifier including MOSFET rectifying devices M3 and M4. Each rectifying device M3 and M4 includes a body diode. With the power switch M1 conducting, the input voltage $V_{IN}$ is applied across the primary winding L1. The secondary winding L2 is oriented in polarity to respond to the primary voltage with a current flow through an output inductor L3, through a load $R_{LOAD}$ connected to the output lead $V_{OUT}$, and back through the MOSFET rectifier device M4 to the secondary winding L2. Continuity of the current flow in the inductor L3 when the power switch M1 is non-conducting is maintained by the current path provided by the conduction of the MOSFET rectifier device M3. An output filter capacitor C52 shunts the output of the converter 100.

Conductivity of the two rectifier devices M3 and M4 is controlled by gate drive logic 108 which may be part of or may receive signals from the PCMC controller 102. As shown in FIGS. 1A and 1B, the PCMC controller 102 may include an output control node MAIN_GATE which provides a PWM drive signal to a driver circuit 110 that is operative to drive the main switch M1 and the auxiliary switch M2 responsive to the output from the PCMC controller 102.

The isolated secondary control or feedback circuit 106 includes a current sensor circuit 112 that is operative to sense the load current IoutLOAD of the power converter 100. The secondary control circuit 106 also includes a voltage sensor circuit 114 that is operative to sense the output voltage $V_{OUT}$ of the power converter 100. The current sensor circuit 112 and the voltage sensor circuit 114 may be coupled to a feedback isolator circuit 116 via error amplifiers 118 and 120, respectively. The feedback isolator circuit 116 provides an error control signal V_FB to the PCMC controller 102, as discussed further below. The current sensor circuit 112 and the voltage sensor circuit 114 may be any suitable circuits operative to sense current and voltage, respectively, and may include one or more transformers, one or more resistors, etc. The feedback isolator circuit 116 may be a circuit that is operatively to galvanically isolate the secondary control circuit 106 from the power train circuit 104 and the PCMC controller 102. For example, the feedback isolator circuit 116 may include a transformer or an optical isolator.

Referring to FIGS. 1B and 1C, the PCMC controller 102 includes an analog clock circuit 122, an analog current sensor circuit 124, an analog peak current detector circuit 126, an analog latch circuit 128, an analog gate circuit 130, and an analog slope compensation circuit 132. Initially, the general functionality of these circuits is discussed, followed by a more detailed discussion of the operation of the circuits.

Generally, in operation of the PCMC controller 102, a current (e.g., primary side current, secondary side current) of the power train circuit 104 is sensed and compared to a control input, which is a filtered version designated VFB_FILTERED of the feedback signal V_FB from the secondary control circuit 106. The value of the VFB_FILTERED signal sets the peak value of the sensed current when the power converter 100 is operating. Each switching cycle when the sensed current of the power train circuit 104 reaches the value of the VFB_FILTERED signal, the PCMC controller 102 turns off the main switch M1. This functionality is in contrast to duty cycle control where the duty cycle is set by a pulse width modulator, which in turn receives a control signal from a feedback circuit. In the PCMC controller 102, the switch M1 is turned off and the duty cycle of the switch is determined based on sensing a current in the power train circuit 104 itself.

At the beginning of each switching cycle, the clock circuit 122 of the PCMC controller 102 sets the latch circuit 128, which causes the main switch M1 to be turned on via the MAIN_GATE control signal output to the driver circuit 110 of the power train circuit 104. The sensed current in the power train circuit 104 then begins to ramp up. At a time when the sensed current reaches the command with the control input (e.g., VFB_FILTERED signal), the peak current detector circuit 126 outputs a reset signal. That reset signal resets the latch circuit 128, which causes the main switch M1 to be turned off. Thus, the MAIN_GATE control signal is high at the beginning of each switching cycle, then stays high and keep the switch M1 turned on until the sensed current reaches the control value VFB_FILTERED. Then, the MAIN_GATE control signal goes low and turns the switch M1 off, and the cycle repeats.

The clock circuit 122 includes an analog comparator U12, resistors R2, R3, R4, R5, R6, R7, and R13, capacitors C1 and C2, and diodes D2 and D6. As an overview, the clock circuit 122 sets the operating frequency and timing reference for the PCMC controller 102. The clock circuit 122 also sets the maximum allowable duty cycle for the PCMC controller 102. As noted above, the clock circuit 122 also provides the "set" command signal, and provides a signal used by the slope compensation circuit 132 to prevent subharmonic oscillation.

The current sensor circuit 124 includes a current transducer B1 (e.g., current transformer, resistor), resistors R1 and R14, capacitor C4, and zener diode D17. In operation, the current transducer B1 of the current sensor circuit 124 senses the peak primary switch current or peak current of the output inductor L3, for example. The current transducer B1 may be any type of current transducer, such as a current transformer or a resistor. The current transducer B1 may be part of the current sensor circuit 112, or may be separate therefrom.

The peak current detector circuit 126 includes an analog comparator U4, resistors R18 and R22, capacitor C9, zener diodes D4 and D8, and diode D5. Generally, the comparator U4 compares the peak current sensed by the current sensor circuit 124, translated to a voltage, to the filtered feedback voltage VFB_FILTERED from the secondary control circuit 106. When the sensed peak current crosses the level of the VFB_FILTERED signal, the comparator U4 generates a "reset" command by discharging a latching capacitor C3 of the latch circuit 128 which turns off the power switch M1 of the power train circuit 104 until the next switching cycle begins.

The latch circuit 128 comprises an analog comparator U8, the latching capacitor C3, and resistors R10 and R11. The latch circuit 128 keeps the switch M1 turned off for the remainder of a cycle after the reset signal is provided by the comparator U4.

The gate circuit 130 includes an analog comparator U13, resistors R8, R9, and R12, and an OR-circuit (or "ORing circuit") formed by diodes D3 and D7. The comparator U13 receives inputs from both the latch circuit 128 and the clock circuit 122. The gate circuit 130 together with the clock circuit 122 guarantees that the MAIN_GATE control signal provided to the driver circuit 110 of the power train circuit 104 does not stay high for longer than the duty cycle of the clock circuit 122, thus setting the maximum duty cycle of the PCMC controller 102.

The slope compensation circuit 132 includes the diode D1, resistors R15, R16, and R17, capacitor C5, and a transistor Q6. A more detailed discussion of the operation of the circuits 122, 124, 126, 128, 130 and 132 is provided below.

In operation, the clock circuit 122 utilizes the comparator U12 to generate a clock signal at a CLOCK node and a charge signal at a LATCHCAP_CHARGE node. The clock sets the operating frequency of the PCMC controller 102 and establishes the maximum duty cycle of the power train circuit 104. The comparator U12 includes a non-inverting input terminal or node, an inverting input terminal, a non-inverting output terminal, and an inverting output terminal that is complementary to the non-inverting output terminal. The non-inverting output terminal is coupled to the CLOCK node and the inverting output terminal is coupled to the LATCHCAP_CHARGE node. The non-inverting input terminal of the comparator U12 is coupled to a voltage divider comprising the resistors R2, R3, and R5. The feedback resistor R4 is coupled between the non-inverting input terminal and the non-inverting output terminal of the comparator U12. A SYNC_IN signal is coupled between the resistors R3 and R5 to allow the PCMC controller 102 to be synchronized to a frequency of other components of a system. In at least some implementations, the PCMC controller 102 may be operative to be synchronized upward and downward to a range of frequencies (e.g., 450-550 kHz) via the SYNC_IN signal.

The inverting input terminal of the comparator U12 is coupled to the capacitor C1, and is also coupled to the non-inverting output terminal via the resistors R6 and R7 and the diode D2. When the non-inverting output terminal of the comparator U12 is high, the capacitor C1 charges via the resistors R7 and R6. When the voltage on the capacitor C1 reaches the voltage of the non-inverting input terminal, then the output of the comparator U12 switches to low. When the output of the comparator U12 transitions from high to low, the voltage at the non-inverting input terminal transitions from approximately 2/3 of $V_{CCP}$ to approximately 1/3 of $V_{CCP}$. Further, when the output of the comparator U12 switches from high to low, the capacitor C1 is discharged through the resistors R6 and R7 and the diode D2. The ratio of the values of the resistors R6 and R7 sets the duty cycle of the clock circuit 122, and the charge/discharge time of the capacitor C1 sets the period of the clock circuit. Thus, by appropriate selection of the various components, the clock circuit 122 may be designed to have a desired frequency and duty cycle for a particular application.

The LATCHCAP_CHARGE node is operatively coupled to a LATCHCAP node of the latching capacitor C3 via the diode D6 and the resistor R13 to provide the "set" command by selectively charging the latching capacitor.

The CLOCK node is also coupled to the slope compensation circuit 132 via the diode D1. The slope compensation circuit 132 generates a ramp signal that is added to an output of the current sensor circuit 124 via the resistor R16 to generate a peak current slope compensation signal IPK_SLOPECOMP that is fed into the inverting input terminal of the comparator U4 of the peak current detector circuit 126. The slope compensation circuit 132 prevents subharmonic oscillation when the PCMC controller 102 is operating at more than 50% duty cycle, for example.

The current transducer B1 is operative to generate a current sensor signal that is proportional to a current in the primary side or secondary side of power train circuit 104. For example, the current transducer B1 may generate a signal that is proportional to the current through the inductor L3, designated $I_O(PEAK)$ in FIG. 1A. In other implementations, the current transducer B1 may be operative to sense another current in the power train circuit 104, such as the current through the main switch M1. The resistor R1 transforms the current sensor signal from the current transducer B1 into a corresponding voltage, which is fed to the inverting input of the comparator U4 of the peak current detector circuit 126. The capacitor C4 is provided as a filter. The values of the resistors R14 and R16 operate to weight the amount of slope compensation that is applied to the current sensor signal.

As noted above, the slope compensated output of the current transducer B1, i.e., IPK_SLOPECOMP, is fed into the inverting input terminal of the comparator U4, also referred to herein as the pulse width modulation (PWM) comparator U4. The comparator U4 also receives the feedback signal V_FB from the secondary control circuit 106, which is fed into the zener diode D4 and divided by the resistors R22 and R18. The Zener diode D8 limits the feedback voltage (or feedback current) to a determined value.

When the output of the comparator U4 goes low as a result of the signal at the IPK_SLOPECOMP node being greater than the VFB_FILTERED signal, the latching capacitor C3 is discharged via the diode D5. At the beginning of each switching cycle, the output LATCHCAP_CHARGE node from the comparator U12 charges the capacitor C3 via the diode D6 and the resistor R13. The value of the resistor R13 controls how fast the latching capacitor C3 is charged each cycle. The value of the resistor R13 may be selected so that the latching capacitor C3 is not charged too quickly, which could cause an undesirable amount of electromagnetic interference (EMI).

The non-inverting input terminal of the comparator U8 of the latch circuit 128 is coupled to the latching capacitor C3 at a LATCHCAP node. The inverting input terminal of the comparator U8 is coupled to a latch circuit reference voltage circuit provided by the resistors R10 and R11. The comparator U8 buffers the logic output at the LATCHCAP node.

The non-inverting input terminal of the comparator U13 of the gate circuit 130 is coupled to the output of the comparator U8 and the CLOCK node via an ORing circuit formed from the diodes D3 and D7. The inverting input terminal of the comparator U13 is coupled to a gate circuit reference voltage circuit formed by the resistors R8 and R9. The non-inverting output terminal of the comparator U13 comprises the MAIN_GATE node that, in operation, provides a control signal to the driver circuit 110 of the power train circuit 104, which driver circuit is operative to control the operation of the switches M1 and M2 of the power converter 100. By utilizing the clock signal CLOCK, the gate circuit 130 guarantees that the MAIN_GATE control signal does not to stay high for longer than the duty cycle of the clock circuit 122. That is, the clock circuit 122 and gate circuit 130 set the maximum allowable duty cycle for the PCMC controller 102.

Figure 2:
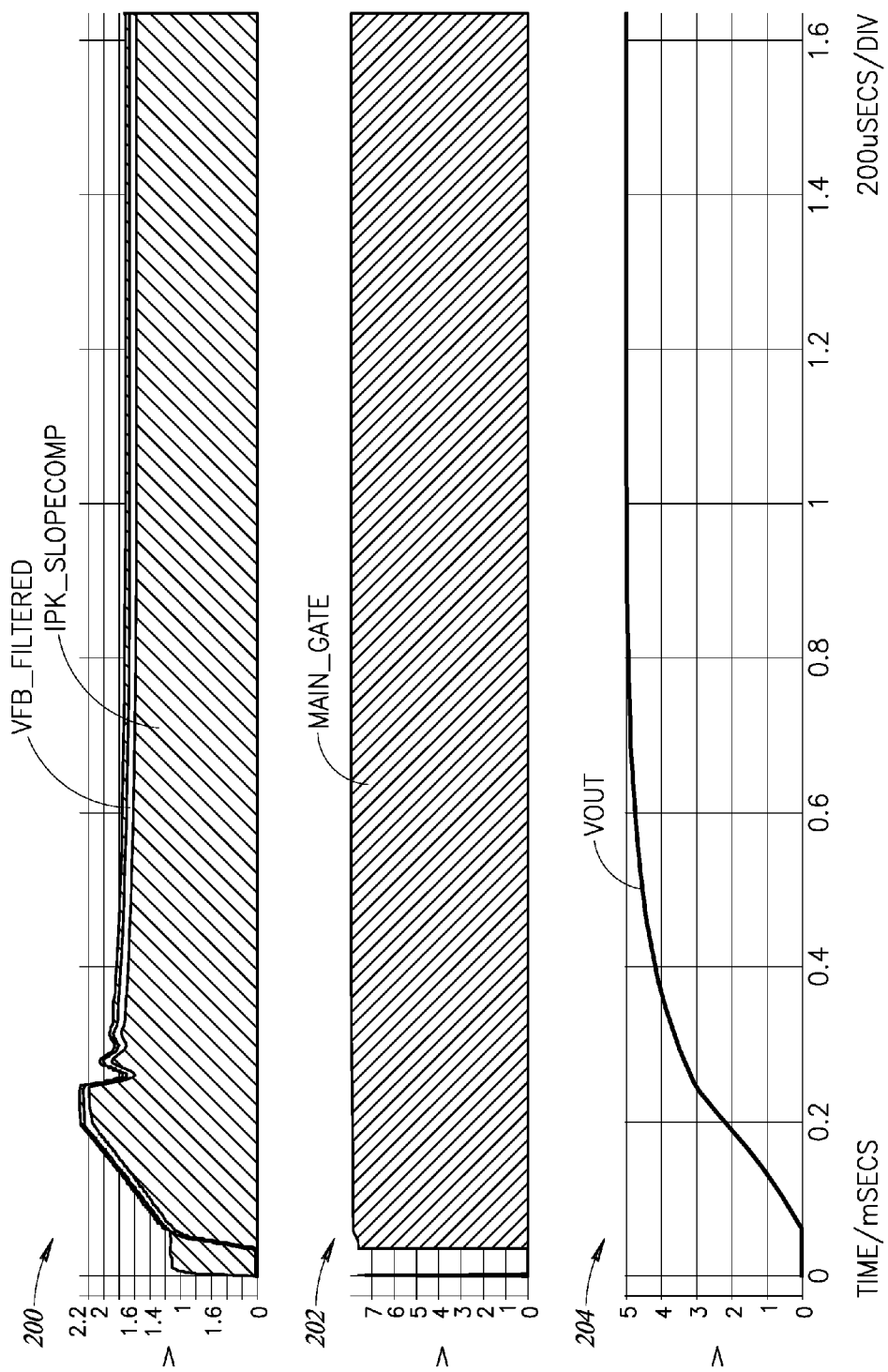
FIG. 2 includes a plurality of graphs showing various waveforms of the power converter of FIGS. 1A-1C during a startup operation, according to one illustrated implementation.

FIG. 2 includes three graphs 200, 202 and 204 showing various waveforms of the power converter of FIGS. 1A-1C during a startup operation. In particular, the graph 200 shows the IPK_SLOPECOMP signal and the VFB_FILTERED signal, the graph 202 shows the MAIN_GATE control signal, and the graph 204 shows the output voltage $V_{out}$ of the power converter 100. Although the IPK_SLOPECOMP and MAIN_GATE signals are shown using cross-hatching, in actuality those signals would appear "solid" at the time scale of the graphs 200 and 204 due to the switching frequency of those signals. That is, at the time scale of the graphs, the rapid transitions of those signals are compressed to appear as solid areas. As can be seen in the graph 204, after startup the power converter 100 regulates the output voltage to 5 V in this example.

Figure 3:
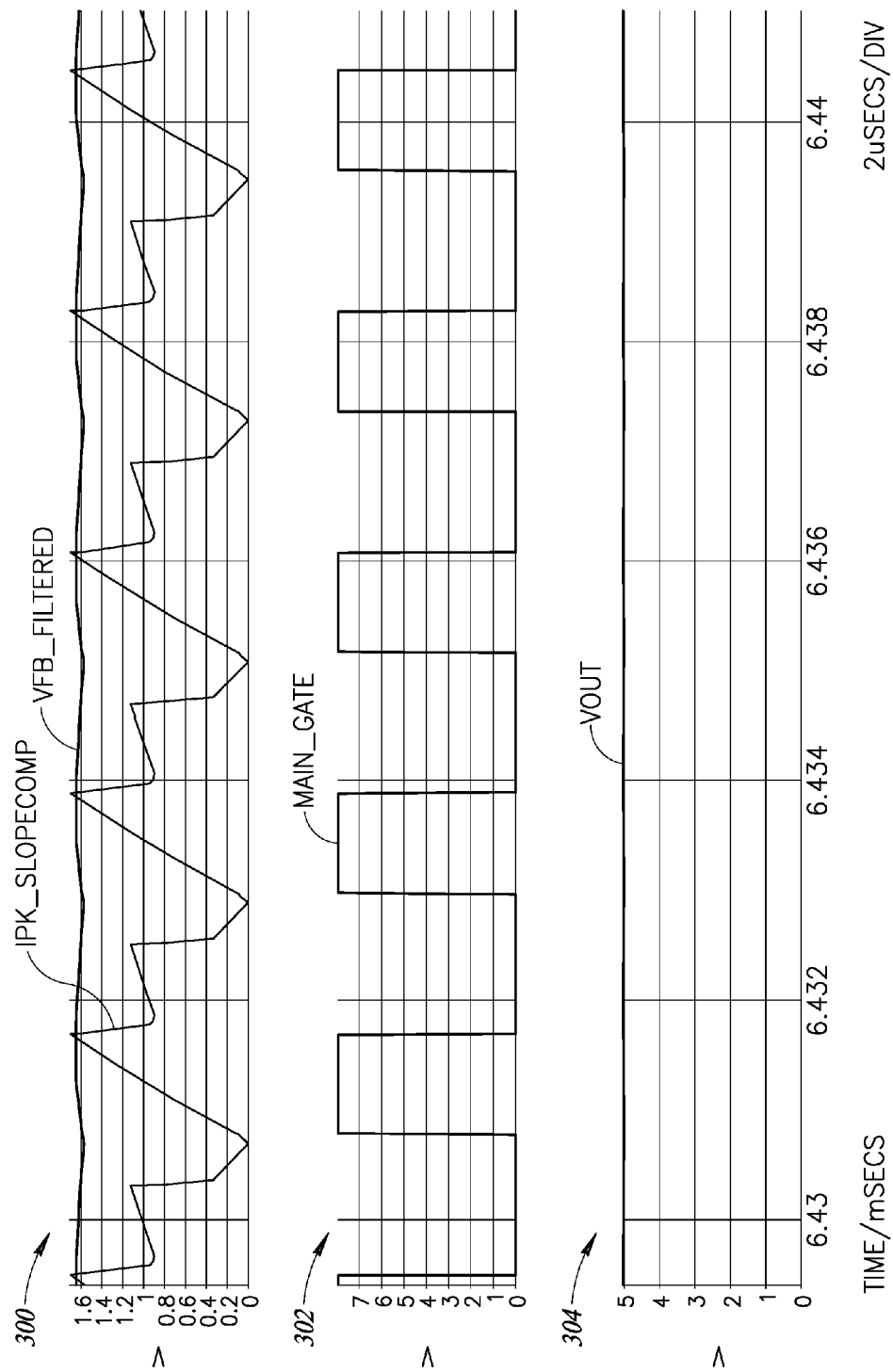
FIG. 3 includes a plurality of graphs showing a gating function of the power converter of FIGS. 1A-1C during operation thereof, according to one illustrated implementation.

FIG. 3 includes three graphs 300, 302 and 304 that zoom in on respective portions of the graphs 200, 202, and 204 of FIG. 2, illustrating the gating function of the power converter 100 of FIGS. 1A-1C during operation thereof. As shown, the MAIN_GATE control signal terminates immediately when the peak current IPK_SLOPECOMP crosses above the error control signal VFB_FILTERED, thereby providing peak current mode control using only discrete analog components.

Figure 4:
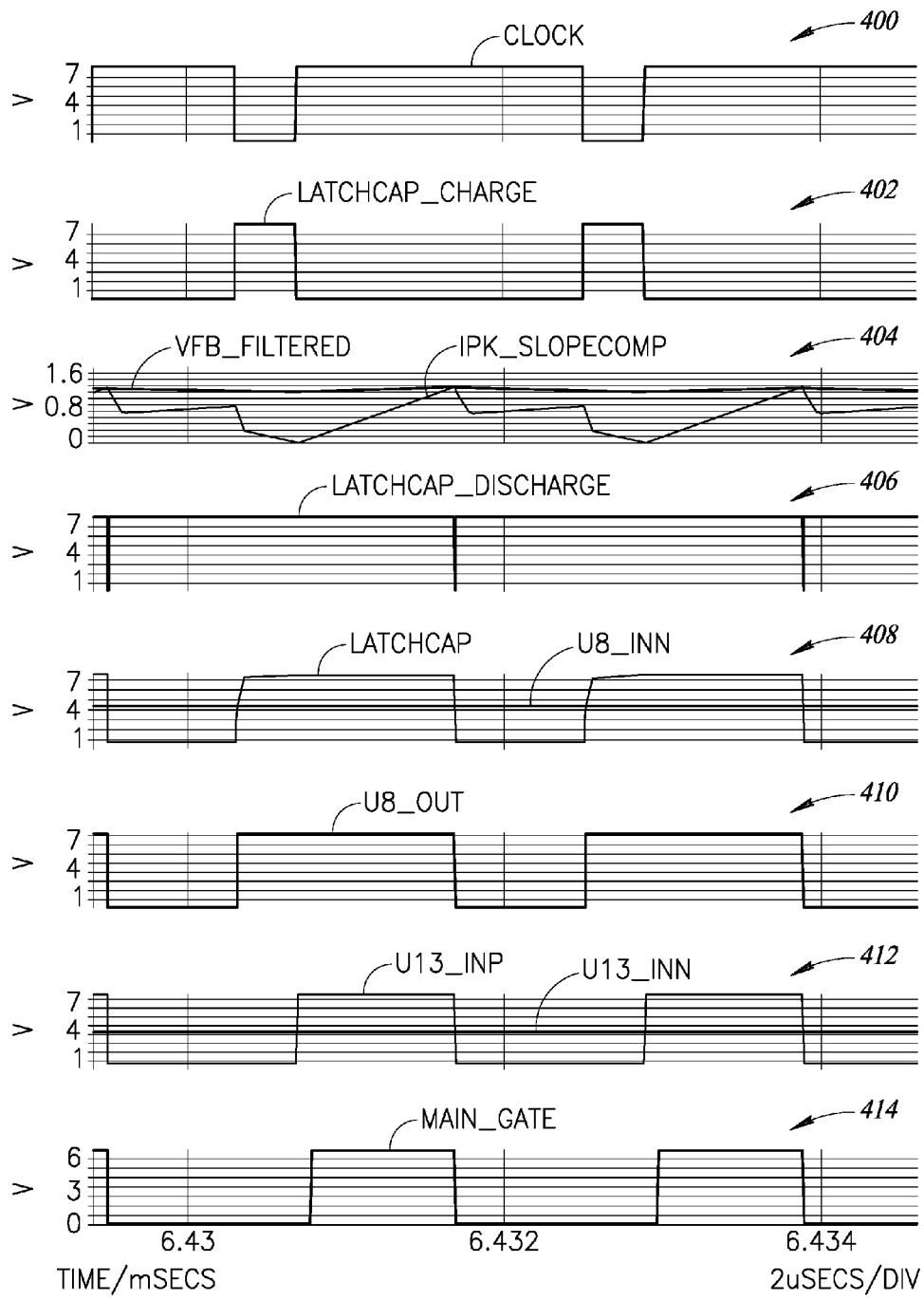
FIG. 4 includes a plurality of graphs showing various waveforms of the power converter of FIGS. 1A-1C during operation thereof, according to one illustrated implementation.

FIG. 4 includes graphs 400, 402, 404, 406, 408, 410, 412 and 414 that show various waveforms of the power converter 100 of FIGS. 1A-1C during operation thereof. In particular, the graph 400 shows the CLOCK signal; the graph 402 shows the LATCHCAP_CHARGE signal; the graph 404 shows the VFB_FILTERED signal and the IPK_SLOPECOMP signal; the graph 406 shows the LATCHCAP_DISCHARGE signal; the graph 408 shows the LATCHCAP signal and the U8_INN signal, which is the inverting input terminal of the comparator U8; the graph 410 shows the U8_OUT signal, which is the non-inverting output terminal of the comparator U8; the graph 412 shows the U13_INP signal, which is the non-inverting input terminal of the comparator U13, and the U13_INN signal, which is the inverting input terminal of the comparator U13; and the graph 414 shows the MAIN_GATE signal.

As can be seen from the graphs 402-414, the CLOCK signal provides the operating frequency and all timing references for the PCMC controller 102. The MAIN_GATE control signal causes the power switch M1 to turn on only during the rising edge of the CLOCK signal and causes the switch M1 to turn off when the peak current (IPK_SLOPECOMP) crosses the error control signal (VFB_FILTERED), thus providing peak current mode control for the power converter 100.

Advantageously, the implementations of the present disclosure provide high-performance, high-efficiency, and radiation tolerant controllers for power converters using readily available analog discrete components. The normally digital logic functions for latching, set, reset, and clocking are performed through a use of a minimal number of analog components, which provides PCMC controllers that are significantly more tolerant to radiation effects.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A peak current mode control (PCMC) controller for a power converter, the power converter comprising one or more controllable switches that selectively electrically couples a power source to a load, the PCMC controller comprising:
 a latch circuit comprising an analog comparator and a latching capacitor, the analog comparator comprising a first input node coupled to the latching capacitor, a second input node coupled to a latch circuit reference voltage circuit, and an output node;
 a peak current detector circuit comprising an analog comparator having a first input node coupled to a current sensor circuit that, in operation, senses a current of the power converter, a second input node coupled to an error control signal circuit, and an output node coupled to the latching capacitor, in operation the peak current detector circuit compares a current sensor signal received from the current sensor circuit to an error control signal received from the error control signal circuit and, responsive to detecting that the current sensor signal exceeds the error control signal, causes the latching capacitor to discharge;
 a clock circuit comprising an analog comparator, in operation, the clock circuit generates a clock signal at a clock signal node and a charge signal at a charge signal node, the charge signal node being coupled to the latching capacitor to selectively charge the latching capacitor; and
 a gate circuit comprising an analog comparator having a first input node coupled to a gate circuit reference voltage circuit, a second input node coupled to the clock signal node and to the output node of the analog comparator of the latch circuit via an OR-circuit, and an output node that, in operation, provides a control signal to the one or more controllable switches of the power converter.

2. The PCMC controller of claim 1, further comprising: a slope compensation circuit comprising an input node coupled to the clock signal node, and an output node coupled to the first input node of the analog comparator of the peak current detector circuit.

3. The PCMC controller of claim 1, further comprising: a current sensor circuit comprising a current transducer that, in operation, senses a current of the power converter.

4. The PCMC controller of claim 3 wherein the current transducer comprises a transformer or a resistor.

5. The PCMC controller of claim 1 wherein the OR-circuit comprises a plurality of diodes.

6. The PCMC controller of claim 1 wherein the analog comparator of the clock circuit comprises first and second complementary output nodes, the clock signal is generated at the first output node and the charge signal is generated at the second output node.

7. The PCMC controller of claim 1 wherein the output node of the peak current detector circuit is coupled to the latching capacitor via a diode.

8. The PCMC controller of claim 1 wherein the charge signal node of the clock circuit is coupled to the latching capacitor via a diode and a resistor coupled together in series.

9. A power converter, comprising:
 a transformer having a primary winding and a secondary winding, the primary winding electrically coupleable to an input voltage node and the secondary winding electrically coupleable to an output voltage node;
 a primary circuit electrically coupled to the primary winding, the primary winding comprising at least one controllable switch; and
 a peak current mode control (PCMC) controller, comprising:
  a latch circuit comprising an analog comparator and a latching capacitor, the analog comparator comprising a first input node coupled to the latching capacitor, a second input node coupled to a latch circuit reference voltage circuit, and an output node;
  a peak current detector circuit comprising an analog comparator having a first input node coupled to a current sensor circuit that, in operation, senses a current of the power converter, a second input node coupled to an error control signal circuit, and an output node coupled to the latching capacitor, in operation the peak current detector circuit compares a current sensor signal received from the current sensor circuit to an error control signal received from the error control signal circuit and, responsive to detecting that the current sensor signal exceeds the error control signal, causes the latching capacitor to discharge;

a clock circuit comprising an analog comparator, in operation, the clock circuit generates a clock signal at a clock signal node and a charge signal at a charge signal node, the charge signal node coupled to the latching capacitor to selectively charge the latching capacitor; and a gate circuit comprising an analog comparator having a first input node coupled to a gate circuit reference voltage circuit, a second input node coupled to the clock signal and the output node of the analog comparator of the latch circuit via an OR-circuit, and an output node that, in operation, provides a control signal to the one or more controllable switches of the power converter.

10. The power converter of claim 9 wherein the PCMC controller further comprises a slope compensation circuit comprising an input node coupled to the clock signal node, and an output node coupled to the first input node of the analog comparator of the peak current detector circuit.

11. The power converter of claim 9, further comprising: a current sensor circuit comprising a current transducer that, in operation, senses a current of the power converter.

12. The power converter of claim 9 wherein the output of the peak current detector circuit is coupled to the latching capacitor via a diode, and the charge signal of the clock circuit is coupled to the latching capacitor via a diode and a resistor coupled together in series.

13. A peak current mode control (PCMC) controller for a power converter that, in operation, controls the power converter according to peak current mode control, the power converter comprising one or more controllable switches, the PCMC controller comprising:

an analog latch circuit comprising an input and an output, the input coupled to a latching capacitor;

an analog peak current detector circuit comprising an output coupled to the latching capacitor, in operation the analog peak current detector circuit compares a current sensor signal to an error control signal and, responsive to detecting that the current sensor signal exceeds the error control signal, causes the latching capacitor of the analog latch circuit to discharge;

an analog clock circuit that, in operation, generates a clock signal and a charge signal, the charge signal coupled to the latching capacitor to selectively charge the latching capacitor; and an analog gate circuit having an input coupled to the clock signal and the output of the analog latch circuit via an OR-circuit, and an output that, in operation, provides a control signal to the one or more controllable switches of the power converter.

14. The PCMC controller of claim 13, further comprising: a slope compensation circuit comprising an input coupled to the clock signal, and an output coupled to the current sensor signal.

15. The PCMC controller of claim 13, further comprising: an analog current sensor circuit comprising a current transducer that, in operation, senses a current of the power converter.

16. The PCMC controller of claim 15 wherein the current transducer comprises a transformer or a resistor.

17. The PCMC controller of claim 13 wherein the OR-circuit comprises a plurality of diodes.

18. The PCMC controller of claim 13 wherein the analog clock circuit comprises first and second complementary outputs, the clock signal is generated by the first output and the charge signal is generated by the second output.

19. The PCMC controller of claim 13 wherein the output of the analog peak current detector circuit is coupled to the latching capacitor via a diode.

20. The PCMC controller of claim 13 wherein the charge signal of the analog clock circuit is coupled to the latching capacitor via a diode and a resistor coupled together in series.

* * * * *